United States Patent [19]
Boyd et al.

[11] Patent Number: 6,145,478
[45] Date of Patent: Nov. 14, 2000

[54] GRIPPING ASSEMBLY

[75] Inventors: Stewart Boyd; Malcolm Burston, both of Marian, Australia

[73] Assignee: Robert Malcolm Boyd, Queensland, Australia

[21] Appl. No.: 09/377,249

[22] Filed: Aug. 19, 1999

[51] Int. Cl.[7] .............................. A01K 15/04; B68B 3/02; B68B 1/00
[52] U.S. Cl. .................. 119/725; 54/44.1; 54/3
[58] Field of Search .............................. 119/725; 54/44.1, 54/3, 71, 23, 66; D30/137, 138, 140; 294/26, 91

[56] References Cited

U.S. PATENT DOCUMENTS

| D. 284,133 | 6/1986 | Freeland | D8/367 |
| 5,953,889 | 9/1999 | Jones | 54/44.1 |

FOREIGN PATENT DOCUMENTS

| 52920/98 | 8/1998 | Australia | B68B 5/00 |

Primary Examiner—Peter M. Poon
Assistant Examiner—Yvonne R. Abbott
Attorney, Agent, or Firm—Dike, Bronstein, Roberts & Cushman; Peter F. Corless; Lisa Swiszcz Hazzard

[57] ABSTRACT

A gripping assembly which may be used to enable a rider to grip onto a beast such as for buck jumping. The gripping assembly has an elongate pad [11] forming a yoke to be held on the back of a beast and a handle [16] disposed centrally thereon and which is resiliently biased to an upstanding attitude. A retaining aperture [13, 14] is provided at each end of the elongate pad [11] through which a rope tackle [50] passes to extend about the body of a beast to secure the pad [11] to the beast. An eye [17] is formed on the free end of the handle [16] to enable a tail of the rope tackle to be secured thereto whereby tension in the rope tackle pulls the handle toward the yoke. The tackle has a free tail portion which may be grasped with the handle to form a releasable connection for the rope tackle [50].

9 Claims, 4 Drawing Sheets

GRIPPING ASSEMBLY

This invention relates to a gripping assembly.

This invention has particular reference to a gripping assembly which may be wrapped around the body of a beast to provide a releasable hand grip for a rider.

Gripping devices are used in the rodeo sport of bull riding to provide a single hand grip for the rider. Typically the hand grip is in the form of a specially shaped lanyard provided with a looped end. The lanyard may be wrapped around the body of the beast and returned upon itself so that the tail may be gripped together with the encircling lanyard portion by the user for release when the rider is thrown.

Unfortunately, the rope portion which encircles the body of the beast and the tail portion often roll over each other and jam and thus when a rider is jolted to a position at which he is unable to readily release his hand, he is held involuntarily attached to the bull.

In such circumstances, the rider's hands can be retained after the rider has been thrown and this can cause significant injury to the rider. In addition, the adjustment of such ropes to suit different sized beasts is relatively awkward and time consuming. Safety in buckjumping events can also be improved.

The present invention aims to alleviate at least one of the above disadvantages and to provide improved gripping means which may be wrapped around the body of a beast to provide a releasable hand grip for a rider.

With the foregoing in view, this invention in one aspect resides broadly in gripping means including:

a yoke assembly;

a handle upstanding from said yoke assembly;

a mounting on the handle remote from the yoke assembly;

releasable securing means which operatively locates the yoke assembly on the beast to be ridden by extending tightly around the body of the beast and being connected to said mounting, whereby tensioning of the securing means pulls the handle towards said yoke assembly so as to clamp the inverted hand of a user grasping the handle to the yoke assembly.

The handle may be flexible and is preferably resiliently biased to a position extending away from the yoke portion such that upon release of the securing means the handle assembly will move to a released position at which the user's hand is not held thereby against the yoke assembly.

The yoke portion may include and a mounting pad which may be drawn down hard against the back of a beast and/or about its sides by the securing means so as to prevent rolling movement of the pad along the beast. The mounting pad may be associated with individual flexible ties extending from opposite sides thereof which connect to the securing means. A lanyard may form the handle.

Preferably however, the yoke assembly is moulded from plastics material such as reinforced plastics including fibreglass reinforced plastics or non-reinforced plastics such as a resilient polyurethane material. The yoke assembly is suitably in the form of a wide belt or pad having a handle moulded integrally therewith. Preferably the handle is a strap portion fixed at its base to a medial part of the belt and formed with an eye mounting at its end remote from the belt or pad whereby the handle may be pulled down towards the belt or pad to clamp a user's hand therebetween. If desired the handle may be hingedly connected to the belt or pad.

Preferably the belt or pad is provided with retaining apertures at each end through which the securing means passes to locate the yoke assembly on the beast. The securing means may be a rope tackle having a respective lanyards or ropes extending through respective retaining apertures with one lanyard secured to one end of the belt or pad, the other lanyard being a gripping lanyard and extending through the retaining aperture to the eye mounting.

Preferably the gripping lanyard extends from the eye mounting about an loop in the rope tackle whereby the free end of the gripping lanyard may be returned to tension the rope tackle, and thus clamp the riders hand as described above, and to overlap the handle for gripping by a rider. In this manner if the gripping lanyard is released, the rope tackle is released and the user's hand is freed from its previous clamped position.

In order that this invention may be more readily understood and put into practical effect, reference will now be made to the accompanying drawings which illustrate a typical embodiment of the invention and wherein.

Figure 2:
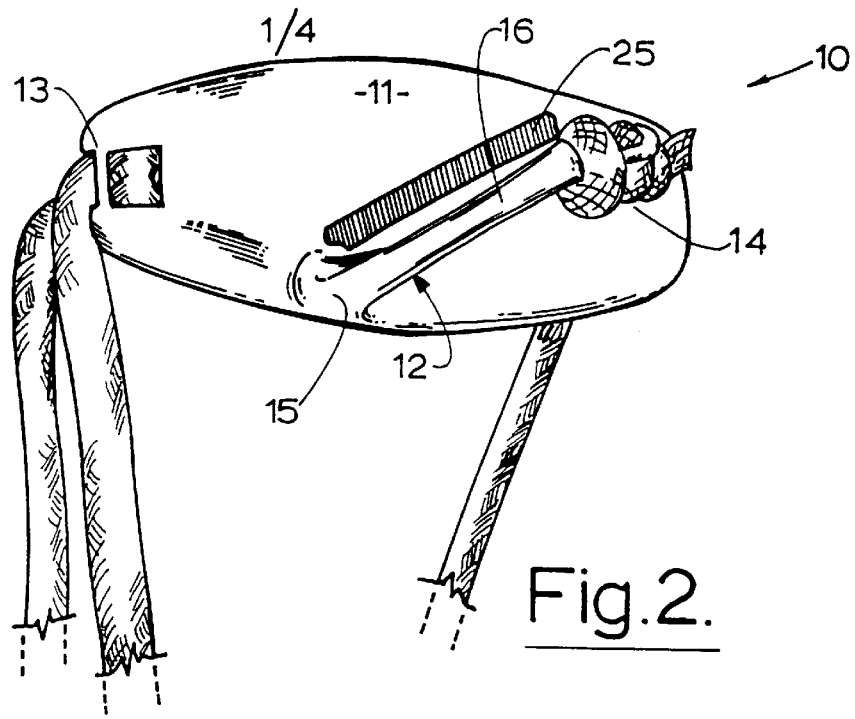
FIG. 2 is a plan view of the gripping device showing its operative configuration.
Figure 1:
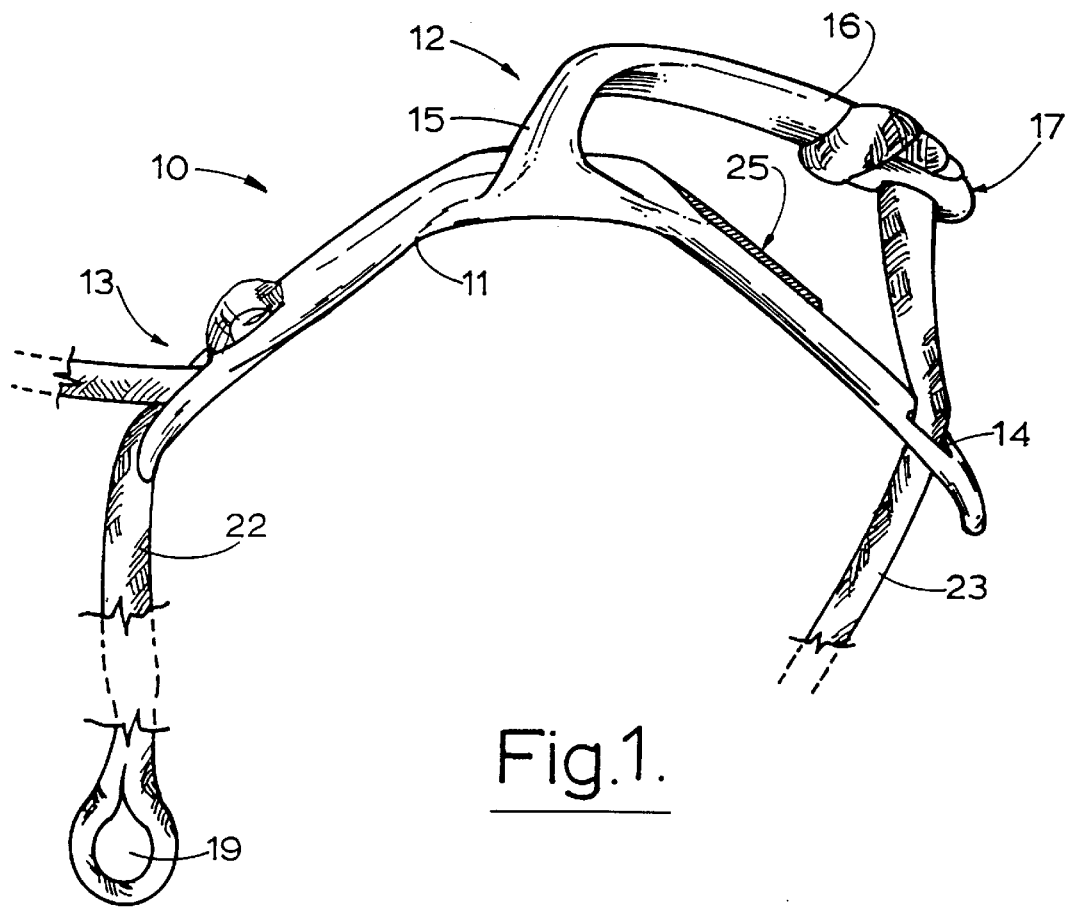
FIG. 1 is an end view of a gripping assembly according to the present invention.
Figure 3:
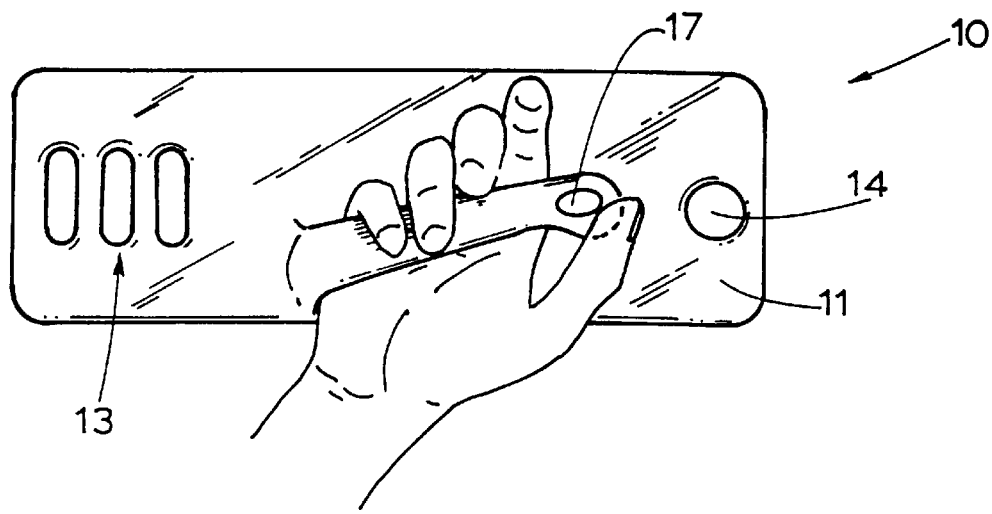
FIG. 3 is a plan view illustrating the manner in which the handle is held.

The gripping assembly 10 shown in FIGS. 1 to 3 of the drawings is moulded of flexible plastics material, such as polyurethane, and includes a wide pad-like yoke portion 11 which may conform about the back of a beast and having an integral handle 12 extending from one side thereof. The wide pad-like yoke portion 11 is provided with a series of apertures 13 at one ends in which the fixed end of a lanyard 22 is adjustably secured, and a single aperture 14 in the opposite end.

The handle assembly 12 includes a resilient base portion 15 which extends away from the pad portion 11 centrally at one side thereof, a more flexible gripping portion 16 which extends angularly across the pad to provide a comfortable grip for a user, and a eye mounting portion provided with an eye 17 locatable adjacent the aperture.

In use, a first lanyard 22 formed with a loop 19 at its free end is secured through one or more of the apertures 13 and passed beneath the chest of a beast such that it may be pulled tight by the gripping lanyard 23 having one end secured to the eye 17 then passing through the aperture 14 for return about the loop 19 in the first lanyard 22. The tail of the gripping lanyard returns from the loop 19 to overlie the handle 12 where it may be gripped by the users hand against the upper face of the handle.

The tail may be pulled tightly to provide a purchase on the first lanyard 22 to tightly secure it and the yoke and at the same time pulling the handle down towards the pad 11 to clamp the user's hand therebetween. The tail is gripped by the fingers of a user's hand inverted beneath the handle as illustrated in FIG. 3.

In this manner, tensioning of the gripping lanyard 23 pulls the handle 12 down towards the yoke portion and clamps the user's hand between the handle 12 and the yoke portion. A soft rubber pad 25 may be located beneath the handle 12 on the yoke into which the user's hand is clamped if desired.

The user's hand will remain clamped while the tensioned tail of the second lanyard is gripped by the user. When the free end of the gripping lanyard 23 is released tension in the first lanyard 22 will be removed and the yoke assembly will be free to move away from its tightened position about the body of the beast. Release of the gripping lanyard 23 should be possible at all times as the pad 11 will prevent the opposite ends of the gripping lanyard 23 from twisting about one another.

In addition, the release of tension from the lanyards will enable the resilient biassing means in the base of the handle to elevate the handle above the yoke, immediately freeing the rider's hand so that the rider will ot get hung up in the gripping means when he is thrown from the beast or when the rider dismounts from the beast.

Figure 4:
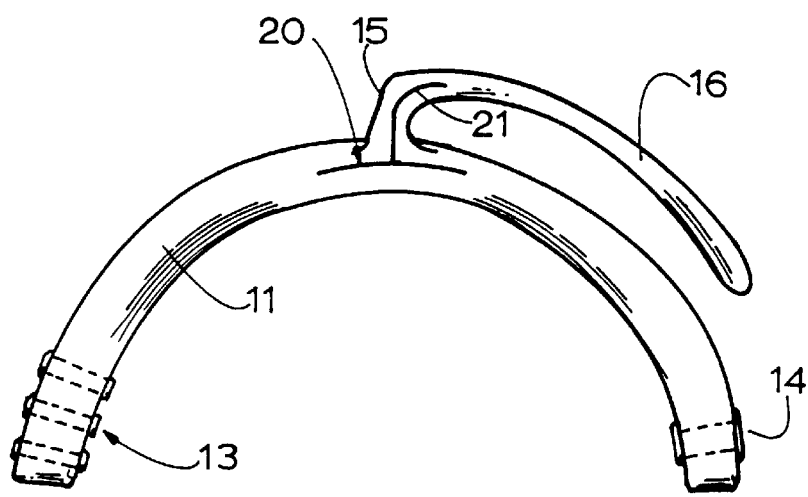
FIG. 4 illustrates one form of biasing the base portion of the hand grip away from the mounting yoke portion of the gripping assembly.

The biassing means shown in FIG. 4 is a spring steel insert 20 having an encapsulated tongue portion 21 which may be drawn to a position adjacent the yoke when the handle assembly is tensioned with the second lanyard. The biassing means may be a wire cable which is looped through the handle to also provide reinforcement to the handle and the aperture 14.

It will also be seen that the plastic pad is relatively wide so that when it is secured about the back of a beast, it will be prevented from rolling such that, in use, the user's hand will not be rolled to a position at which the rider is unable to release the free end of the second lanyard. Thus the lanyards will remain free to move relative to one another and the yoke without fear of binding as may occur in an all rope gripping assembly.

Figure 5:
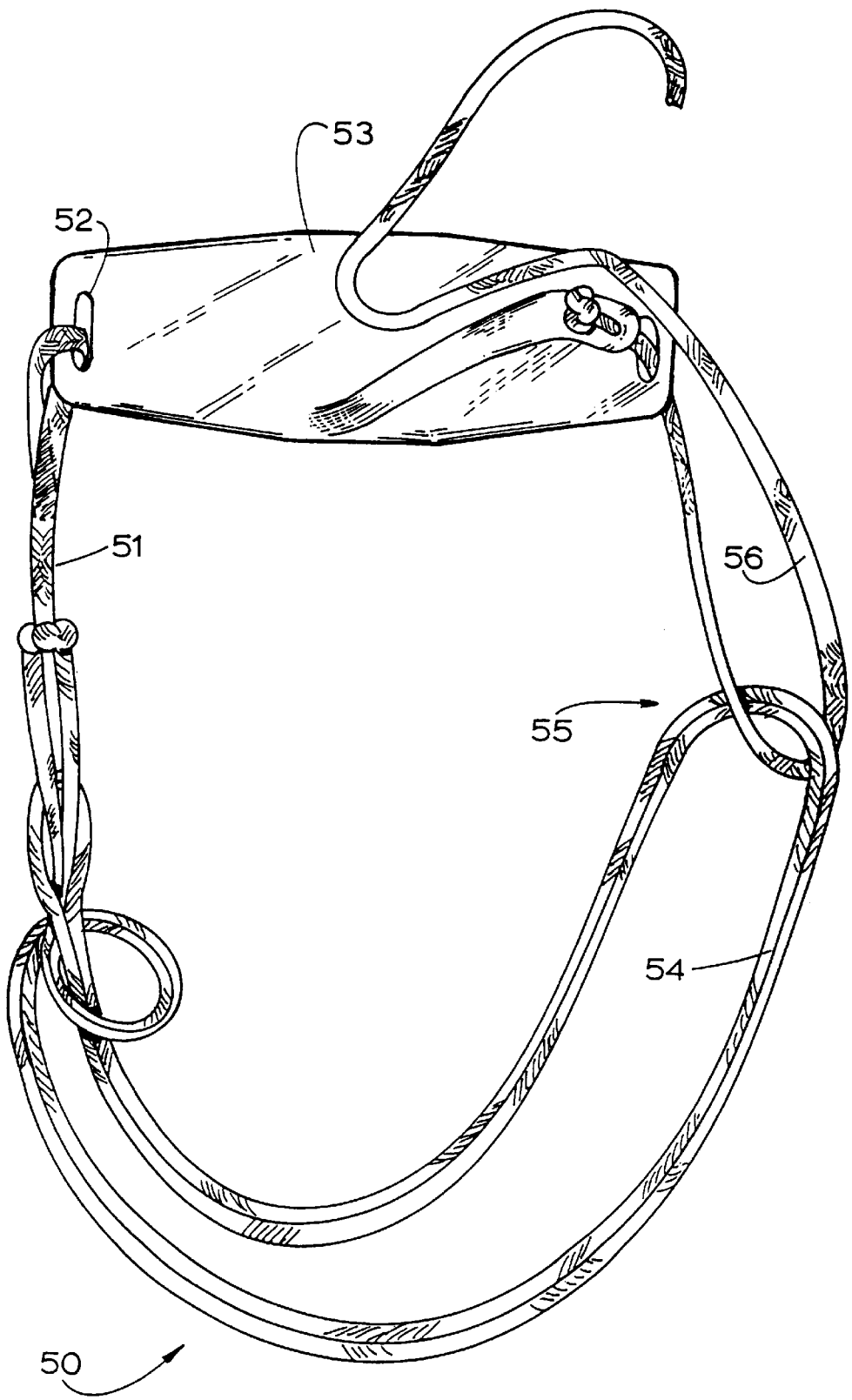
FIG. 5 illustrates a typical rope tackle forming the releasable securing means.

A typical rope tackle 50 is illustrated in FIG. 5. This tackle includes a first lanyard 51 spliced to a single aperture 52 in the pad 53 and to which double rope loops 54 may be tied adjustably using a bowline or the like to provide loops 55 through which the gripping lanyard 56 may pass for applying purchase to the tackle 50.

Figure 6:
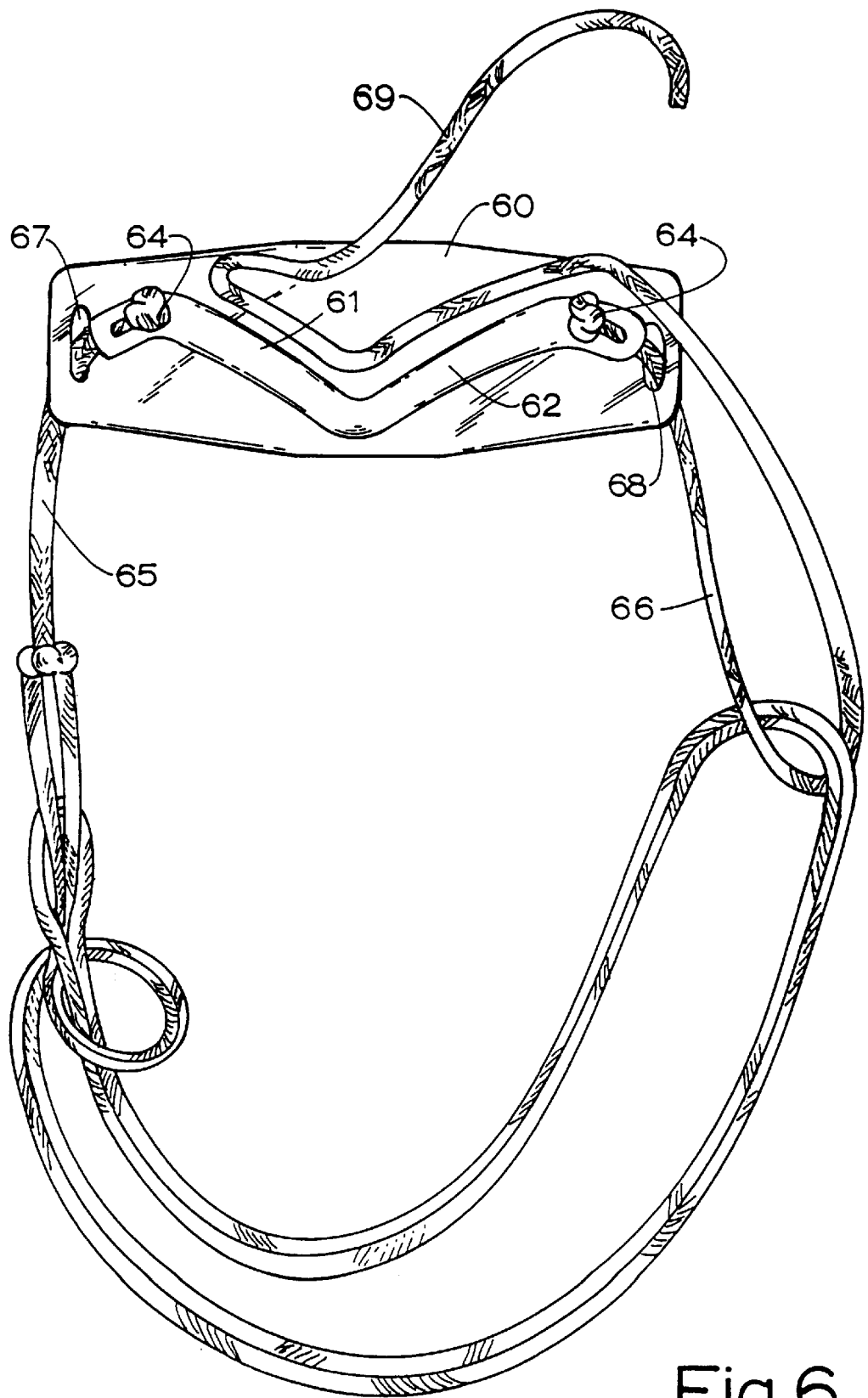
FIG. 6 illustrates a two handle version of the invention.

In the embodiment illustrated in FIG. 6 the pad or yoke 60 has handles 61 and 62 extending away from a common junction with the yoke 60 and each terminating in an eye 64 to which the respective lanyards 65 and 66 extend after passing freely through the apertures 67 and 68. This embodiment enables a rider to hang on with both hands and if desired with both hands gripping the tail 69.

It will of course be realised that the above has been given only by way of illustrative example of the invention and that all such modifications and variations thereto as would be apparent to persons skilled in the art are deemed to fall within the broad scope and ambit of the invention as is defined in the appended claims.

The claims defining the invention are as follows:

1. Gripping means including:

a yoke assembly;

a handle upstanding from the yoke assembly;

a mounting on the handle remote from the yoke assembly;

releasable securing means which may be tensioned around the body of a beast to be ridden to secure the yoke assembly to the beast, the releasable securing means being connected to said mounting whereby tensioning of the releasable securing means pulls the handle towards said yoke assembly so as to clamp the inverted hand of a user grasping the handle to the yoke assembly.

2. Gripping means as claimed in claim 1, wherein said handle is resiliently biased to a position extending away from said yoke assembly.

3. Gripping means as claimed in claim 2, wherein the yoke assembly is moulded from plastics material and the handle is moulded integrally therewith.

4. Gripping means as claimed in claim 3, wherein said handle extends across the yoke assembly in spaced relationship therewith and said mounting is an eye mounting disposed at the end of the handle remote from said yoke assembly whereby the handle is pulled down towards the yoke assembly by tension in the securing means.

5. Gripping means as claimed in claim 4, wherein said securing means includes a lanyard passing from said eye mounting through an adjacent aperture and through an end of said yoke assembly.

6. Gripping means as claimed in claim 4, wherein said yoke assembly is formed as a belt or elongate pad provided with a retaining aperture at each end through which the securing means passes to extend about the body of a beast.

7. Gripping means as claimed in claim 6 wherein said securing means includes a rope tackle.

8. Gripping means as claimed in claim 7, wherein a tail of the rope tackle passes through the eye in said handle whereby the tail may be returned over a standing part enabling the tail and standing part to be grasped to releasably secure the tail to said eye.

9. Gripping means including:

an elongate pad forming a yoke to be held on the back of a beast;

a substantially centrally disposed handle on the yoke and resiliently biased to an upstanding attitude;

an eye on the handle remote from the yoke;

a retaining aperture at each end of the elongate pad through which a rope tackle passes to extend about the body of a beast to secure the yoke to the beast, a tail of the rope tackle being secured to said retaining aperture whereby tension in said rope tackle pulls the handle toward the yoke, and a free tail portion of the rope tackle being returned over the handle to be releasably grasped with the handle so as to release the rope tackle upon release of the handle.

* * * * *